(12) United States Patent
Booth et al.

(10) Patent No.: US 10,703,233 B1
(45) Date of Patent: Jul. 7, 2020

(54) ANTI-SUBMARINE SEAT FOR A VEHICLE

(71) Applicant: GM GLOBAL TECHNOLOGY OPERATIONS LLC, Detroit, MI (US)

(72) Inventors: Daniel W. Booth, Troy, MI (US); Brennon L. White, Novi, MI (US); Michael P. Van De Velde, Shelby Township, MI (US); Nilesh D Mankame, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/299,491

(22) Filed: Mar. 12, 2019

(51) Int. Cl.
*B60N 2/42* (2006.01)
*B60N 2/70* (2006.01)

(52) U.S. Cl.
CPC .............. *B60N 2/42* (2013.01); *B60N 2/4214* (2013.01); *B60N 2/7094* (2013.01)

(58) Field of Classification Search
CPC ....... B60N 2/42; B60N 2/4214; B60N 2/7094
USPC ...................................................... 297/216.1
See application file for complete search history.

(56) References Cited

U.S. PATENT DOCUMENTS

| | | | | |
|---|---|---|---|---|
| 6,604,599 B2* | 8/2003 | Yamaguchi | .......... | B60N 2/4221 180/271 |
| 7,373,678 B2* | 5/2008 | Hetzel | .................. | A61G 5/1043 5/653 |
| 7,661,764 B2* | 2/2010 | Ali | .......... | B68G 7/05 297/452.26 |
| 9,446,696 B2* | 9/2016 | Sugiyama | .............. | B60N 2/646 |
| 2002/0190548 A1* | 12/2002 | Ruel | ..................... | B60R 21/207 297/216.1 |
| 2003/0034679 A1* | 2/2003 | Choi | .................... | B60N 2/4221 297/216.1 |
| 2009/0066142 A1* | 3/2009 | Ventura | .................. | B29C 44/12 297/452.26 |
| 2011/0221257 A1* | 9/2011 | Ellison | ................. | B60N 2/7005 297/452.48 |
| 2012/0049603 A1* | 3/2012 | Ellison | ................... | B60N 2/015 297/452.16 |
| 2012/0049604 A1* | 3/2012 | Ellison | ................ | B29C 44/0461 297/452.18 |
| 2012/0256466 A1* | 10/2012 | Lievestro | ............... | A47C 27/15 297/452.18 |
| 2015/0210192 A1* | 7/2015 | Benson | .................. | B60N 2/914 297/217.2 |
| 2015/0329074 A1* | 11/2015 | Khouphongsy | ...... | B60N 2/4221 280/730.1 |
| 2016/0311344 A1* | 10/2016 | Smith | ..................... | B60N 2/242 |
| 2019/0090656 A1* | 3/2019 | Duncan | ................ | A47C 31/126 |

\* cited by examiner

*Primary Examiner* — Mark R Wendell (57) ABSTRACT

A vehicle seat cushion for a vehicle that includes a seat cushion support structure, and a lattice-structured support that is supported by the seat cushion support structure. The lattice-structured support provides a first resistive force in response to a vertically applied force that is less than a second resistive force in response to a force aligned with an H-point travel path of the vehicle occupant during a vehicle impact event.

16 Claims, 6 Drawing Sheets

ANTI-SUBMARINE SEAT FOR A VEHICLE

FIELD

The present disclosure relates to an anti-submarine seat for a vehicle.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Vehicles, such as cars, include vehicle seats. For instance, a vehicle may include several rows of vehicle seats. The vehicle-operator may occupy a vehicle seat in a front row, while passengers may occupy other vehicle seats. Vehicle seats are designed to provide comfortable seating for the vehicle occupants while also providing adequate support for controlling a positioning of the occupants during a vehicle impact event.

In a frontal or rear vehicle impact event, a vehicle occupant has a tendency to "submarine" which means slipping forward in the seat and/or moving downward in the seat in a frontal impact. Alternatively, in a rear impact a vehicle occupant has a tendency to slide upward and backward relative to the seat. In either situation movement of a vehicle seat occupant in the seat is undesirable because vehicle occupant protection systems may rely upon maintaining the vehicle seat occupant in a specific position relative to the seat. For example, if a vehicle seat passenger moves in their vehicle seat during a vehicle impact event, a passenger seat belt system may be unable to adequately control the movement and/or position of the passenger.

Conventional vehicle seats have been designed in an attempt to prevent and/or reduce the submarining of a vehicle seat passenger. For example, a vehicle seat may include a metal (or other rigid material) support structure having a surface which may ramp upwardly in a forward direction positioned underneath a layer of foam. Another exemplary conventional vehicle seat may include a support structure on which a low density, semi-rigid or rigid foam (e.g., expanded Polypropylene, Polyurethane, etc.) is positioned and shaped such that it reduces and/or prevents a vehicle seat occupant from submarining, while also including a more resilient material (e.g., a foam) over the rigid foam and underlying support to improve the comfort of the seat for the vehicle seat occupant. While such conventional vehicle seats may adequately protect a vehicle seat passenger in the event of a vehicle impact event, the comfort of the vehicle passenger may be compromised. It is desirable to improve the comfort of a vehicle seat occupant while continuing to provide adequate support in the event of a vehicle impact event.

SUMMARY

In an exemplary aspect, a vehicle seat cushion for a vehicle includes a seat cushion support structure, and a lattice-structured support that is supported by the seat cushion support structure. The lattice-structured support provides a first resistive force in response to a vertically applied force that is less than a second resistive force in response to a force aligned with an H-point travel path of the vehicle occupant during a vehicle impact event.

In another exemplary aspect, the lattice-structured support includes a first set of trusses substantially aligned with an instantaneous trajectory of a vehicle occupant H-point travel path.

In another exemplary aspect, each of the first set of trusses extend substantially continuously through the entire lattice-structured support.

In another exemplary aspect, the first set of trusses are oriented at an angle of between about 25 to about 60 degrees relative to a horizontal axis.

In another exemplary aspect, the first set of trusses are oriented at an angle of about 45 relative a horizontal axis.

In another exemplary aspect, the lattice-structured support further includes a second set of trusses that extend between adjacent trusses of the first set of trusses.

In another exemplary aspect, each of the second set of trusses are offset relative to each other.

In another exemplary aspect, a plurality of the second set of trusses are V-shaped.

In another exemplary aspect, the lattice-structured support includes a first set of trusses and a second set of trusses. The second set of trusses extend substantially continuously through the lattice-structured support and are aligned with a horizontal axis.

In another exemplary aspect, the first set of trusses are substantially aligned with an instantaneous trajectory of a vehicle occupant H-point travel path.

In another exemplary aspect, the first set of trusses extend between adjacent trusses of the second set of trusses.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Figure 1:
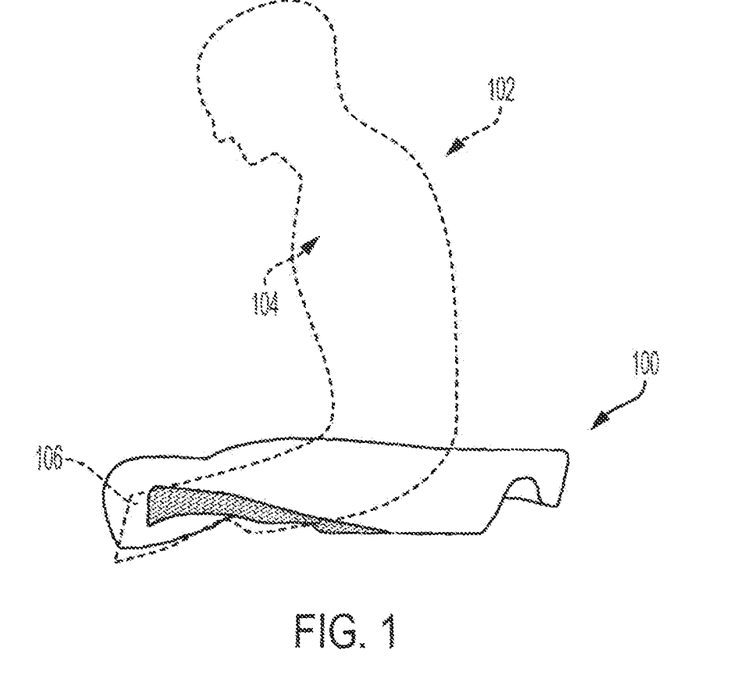
FIG. 1 is a schematic, cross-sectional side elevation view of a conventional vehicle seat 100.
Figure 2:
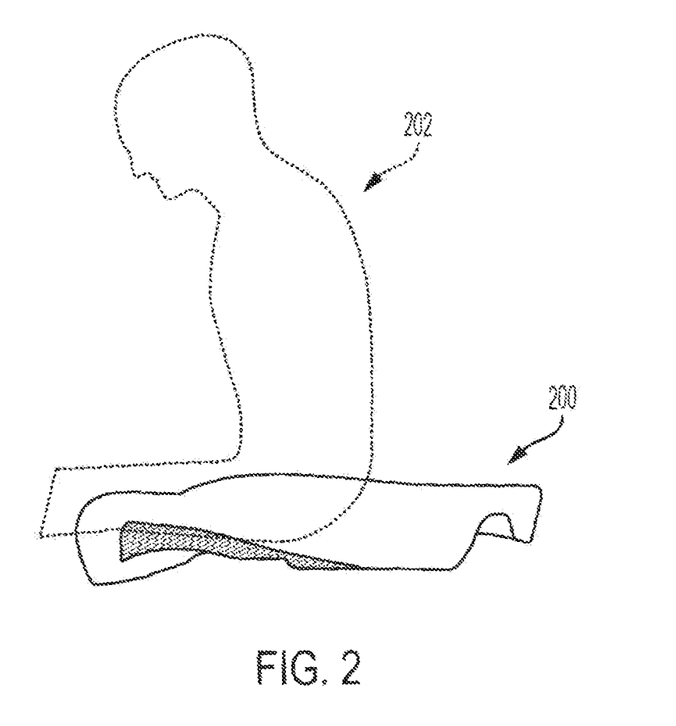
FIG. 2 is a schematic, cross-sectional side elevation view of an exemplary embodiment of a vehicle seat 200 in accordance with the present disclosure.

Referring now to the drawings, wherein like reference numbers correspond to like or similar components throughout the several figures, FIG. 1 is a schematic, cross-sectional side elevation view of a conventional vehicle seat 100 and occupant 102 in a submarine position during a vehicle impact event and FIG. 2 is a schematic, cross-sectional side elevation view of an exemplary embodiment of a vehicle seat 200 in accordance with the present application and occupant 202 during a vehicle impact event. FIG. 1 clearly illustrates the undesirable situation in which a vehicle seat 100 is unable to prevent and/or reduce the submarining of the vehicle seat occupant 102. The vehicle seat occupant 102 has moved forward in the seat and the upper torso 104 has rotated forward and downward and the knee 106 of the occupant 102 has also rotated forward and downward. As explained previously, movement of a vehicle occupant in a vehicle seat is undesirable as the ability of vehicle systems to protect the vehicle occupant during an impact event may be reduced.

Figure 3:
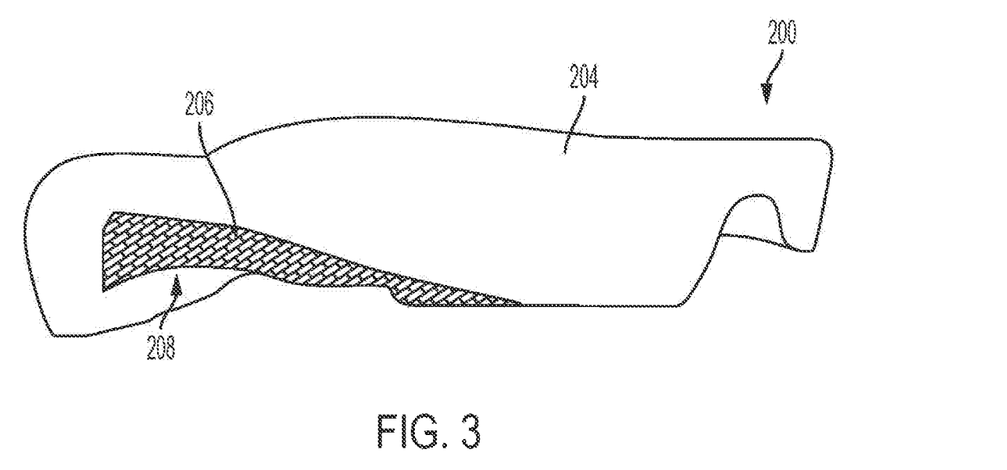
FIG. 3 is a schematic, cross-sectional side elevation view of the exemplary embodiment of a vehicle seat 200 of FIG. 2.

FIG. 3 is a schematic, cross-sectional side elevation view of the exemplary embodiment of a vehicle seat 200 of FIG. 2. The vehicle seat 200 includes a first portion 204 and a second portion 206. The first portion 204 is characterized by a foam with a resiliency that is comfortable to a vehicle seat occupant and which also may include the capacity to fully return the seat to a desired unloaded shape when an occupant is no longer occupying the vehicle seat 200. The second portion 206 is characterized by a lattice structure which is oriented such that it vertically compresses in response to the occupant sitting on the vehicle seat 200 and resists and/or prevents the occupant from submarining during a vehicle impact event. The second portion 206 includes a brick type lattice structure which includes trusses that are oriented such that it resists compression in a first direction while permitting compression in a second (more vertical) direction. The vehicle seat 200 further includes a support structure 208 which provides structural support to the vehicle seat 200. For example, the support structure 208 such as, for example, a seat pan which supports both the first portion 204 and second portion 206.

Figure 4:
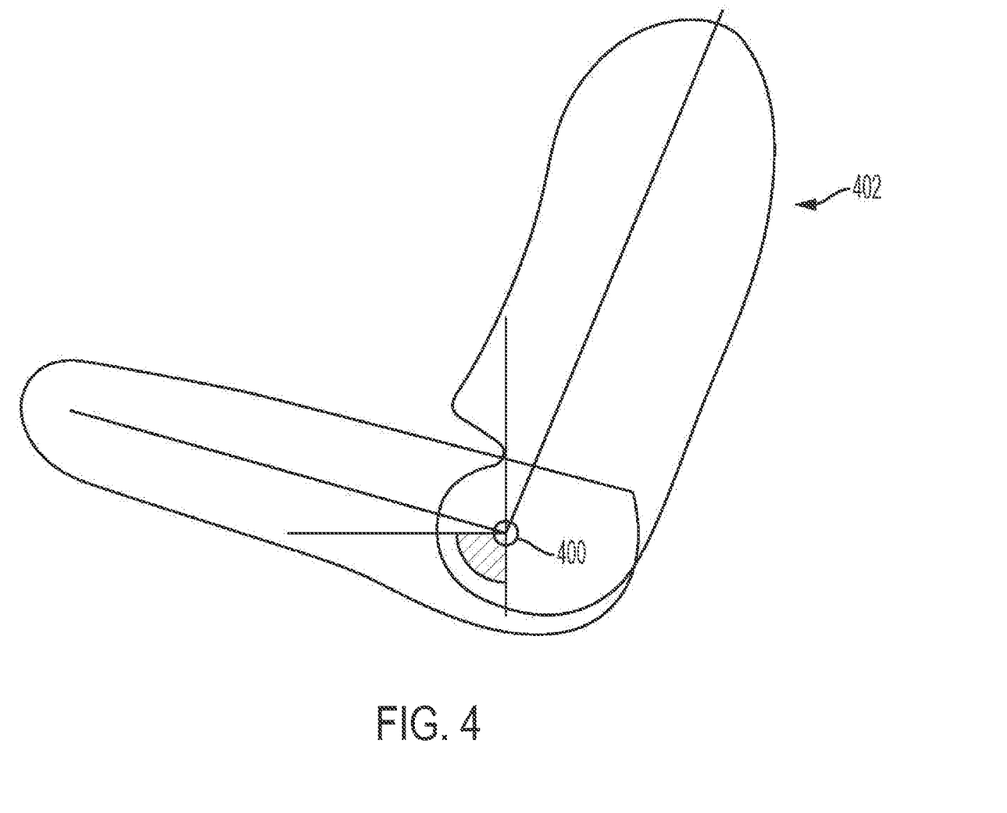
FIG. 4 illustrates an H-point 400 for a vehicle occupant 402.

FIG. 4 illustrates an H-point 400 for a vehicle occupant 402. An H-point is a theoretical, relative location of vehicle occupant's hip. In particular, the H-point is intended to represent the pivot point between the torso and upper leg portions of the vehicle occupant. Determination of an H-point for a vehicle is generally well understood by those of skill in the art. In accordance with exemplary embodiments of the present disclosure, the orientation of a lattice structure may be related to the H-point and/or the travel path of an H-point during a vehicle impact event.

Figure 5:
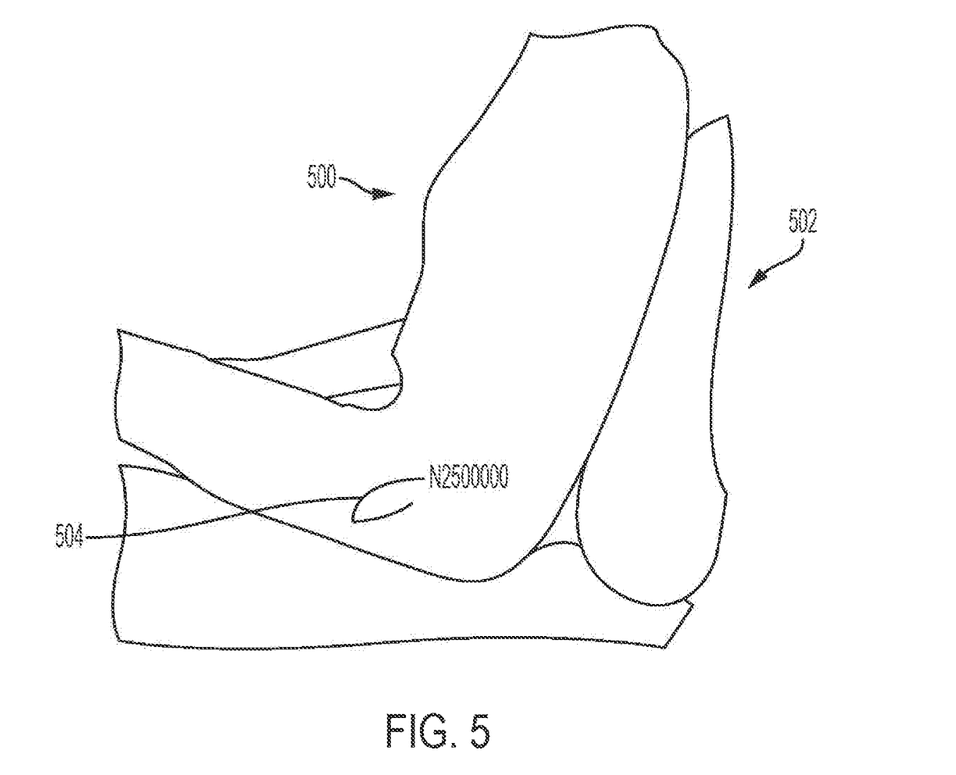
FIG. 5 is a cross-sectional view of a vehicle occupant 500 positioned in a vehicle seat 502.
Figure 6:
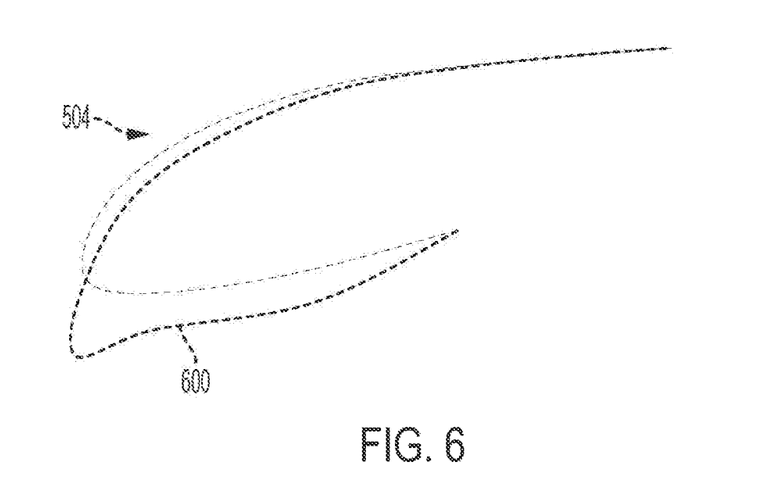
FIG. 6 is a close-up perspective view of the H-point travel path 504.

FIG. 5 is a cross-sectional view of a vehicle occupant 500 positioned in a vehicle seat 502. FIG. 5 further illustrates an H-point travel path 504. The H-point travel path 504 represents the path that the H-point of a vehicle occupant may travel during a vehicle impact event. FIG. 6 is a close-up perspective view of the H-point travel path 504. It is understood that the H-point travel path may vary based upon many different factors including seat belt routing, vehicle seat design, seat height, seat pan angle and the like without limitation. In general, in a vehicle impact event, the H-point travel path tends to move forward and downward. The H-point travel path further tends to a more downward direction as, for example, a seat belt tightens around the vehicle occupant. The downward trajectory of the H-point travel path may also be referred to as submarining. In general, in a vehicle impact event, the H-point travel path tends to move forward and downward. It is desirable to minimize and/or prevent this downward motion. Further, it is desirable for the H-point travel path to resemble a gentle curve and not drop quickly downward. For example, FIG. 6 further illustrates an H-point travel path 600 for a conventional seat design. The H-point travel path 504 is improved over the H-point travel path 600 because it is shorter, the change in direction is more gentle, and it does not extend as far downward.

It is to be understood that the trajectory of the H-point as it travels along the H-point travel path may provide a reference against which an orientation of a lattice structure may be determined in accordance with exemplary embodiments of the present disclosure. The H-point travel path for any given seat design may vary and those of ordinary skill will understand that the orientation of the lattice-structure will need to be adapted to the H-point travel path for any given seat design in accordance with the present disclosure.

Figure 7A:
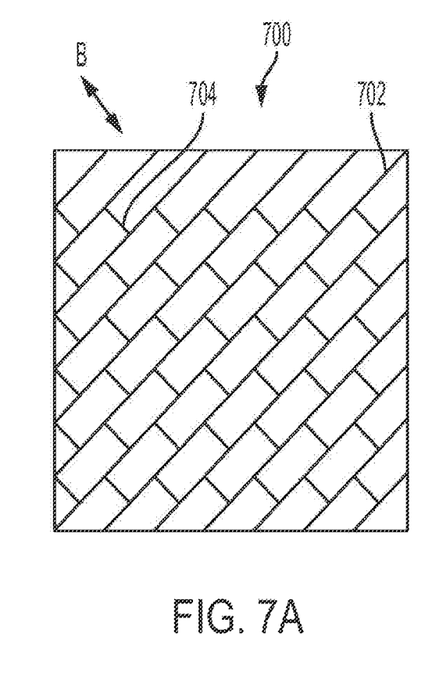
FIGS. 7A-7C illustrate cross-sectional elevation views of an exemplary lattice-structure 700 for an anti-submarine seat cushion.
Figure 7B:
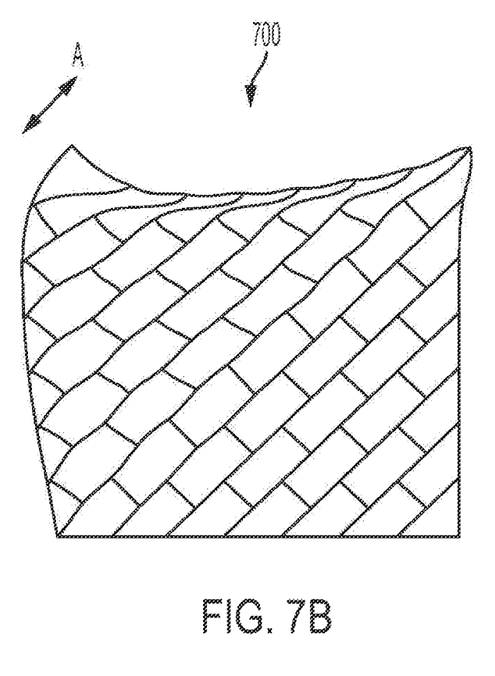
Figure 7C:
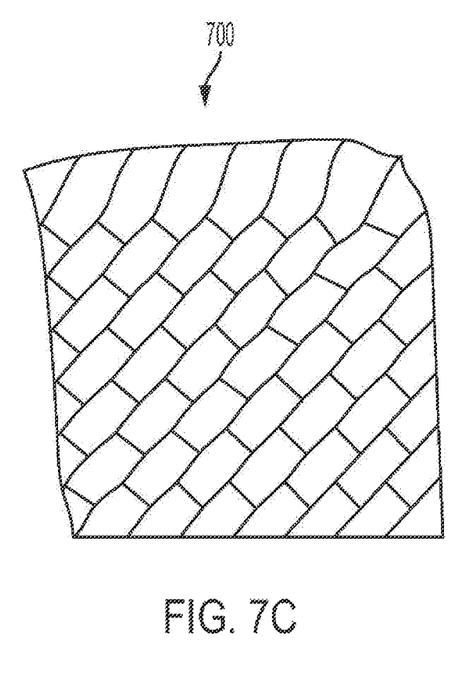

FIGS. 7A-7C illustrate cross-sectional elevation views of an exemplary lattice-structure 700 for an anti-submarine seat cushion. FIG. 7A illustrates the lattice-structure 700 in an unloaded condition, FIG. 7B illustrates the lattice-structure 700 under a downward compression load corresponding to the loading of an occupant in a vehicle seat due to gravity, and FIG. 7C illustrates the lattice-structure 700 experiencing a shear load. The direction of the shear loading may generally align with and/or be oriented with respect to an instantaneous trajectory of an occupant H-point travel path. As illustrated in FIG. 7B the lattice-structure 700 compresses vertically in response to a downward compressive force being applied by an occupant in a vehicle seat incorporating the lattice-structure 700. This ability to compress in a vertical direction ensures the comfort for a vehicle seat comfort. In contrast, as illustrated in FIG. 7C, the lattice-structure 700 increases in height in response to a shear load being applied. In this manner, under a shear load being applied, such as by the H-point of a vehicle occupant traveling along an H-point travel path in response to a vehicle impact event, the lattice-structure 700 not only resists a downward motion of the occupant but also provides a lifting force which opposes the tendency of the vehicle occupant to submarine in the vehicle seat.

The lattice-structure 700 includes a first set of trusses 702 aligned with a first axis A and a second set of trusses 704 aligned with a second axis B. The first set of trusses 702 extend continuously through the lattice-structure 700 and provides a high resistance to compression against a force applied by a vehicle occupant that is generally aligned with the first axis A. In other words, the instantaneous trajectory of an occupant H-point along the H-path travel path is generally aligned with the first axis A and, therefore, with the first set of trusses 702 to effectively resist and/or prevent motion of the H-point in a direction that might otherwise result in a submarining of the occupant. In contrast, the second set of trusses 704 extend only between adjacent first trusses 702 and are offset relative to each other. The inventors have discovered that the orientation of the first set of trusses 702 may be oriented at an angle of between about 25 to about 60 degrees to a horizontal axis to oppose submarining of a vehicle occupant. In the exemplary embodiment illustrated in FIGS. 7A-7C, the first set of trusses 702 are oriented at an angle of about 45 degrees relative to a horizontal axis. In this manner, the substantially horizontal initial trajectory of the H-point travel path may be at an angle of about 45 degrees relative to the first axis A which, therefore, results in a lifting motion illustrated in FIG. 7C.

Figure 8A:
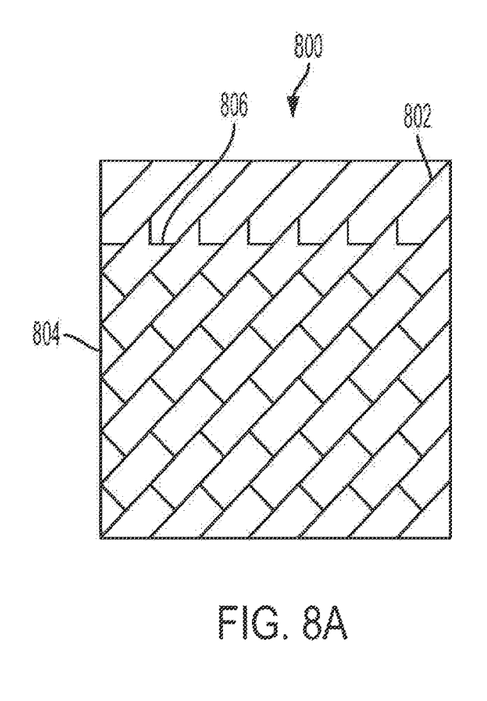
FIGS. 8A-8C illustrate another exemplary embodiment of a lattice-structure 800 in accordance with the present disclosure.
Figure 8B:
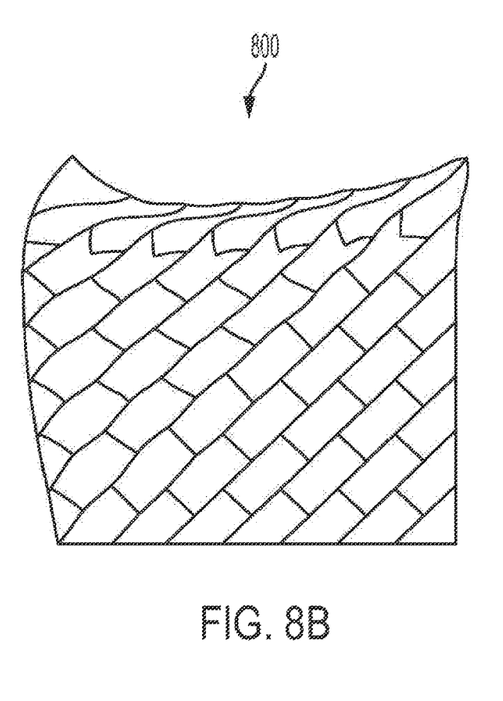
Figure 8C:
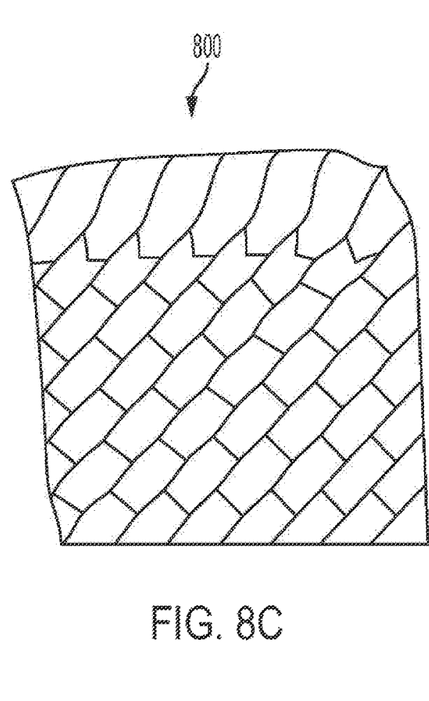

FIGS. 8A-8C illustrate another exemplary embodiment of a lattice-structure 800 in accordance with the present disclosure. The lattice-structure 800 is similar to the lattice-structure 700 illustrated in FIGS. 7A-7C, in that the lattice-structure includes a first set of trusses 802 that extend continuously through the structure 800, however, lattice-structure 800 a second set of trusses 804 with a first row of V-shaped trusses 806. The v-shaped trusses 806 may reduce the resistance to compression in a vertically downward direction and, therefore, improve the comfort of the vehicle seat to an occupant during normal loading conditions. The lattice-structure 800 is, therefore, able to improve the comfort while simultaneously maintaining the ability to oppose a submarining of an occupant during a vehicle impact event. It is to be understood that other exemplary embodiments of a lattice-structure may include additional rows of V-shaped trusses in accordance with the present disclosure.

Figure 9A:
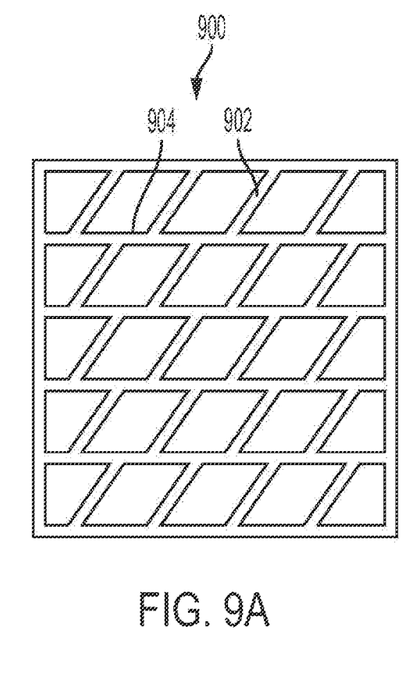
FIGS. 9A-9C illustrate another exemplary embodiment of a lattice-structure 900 in accordance with the present disclosure.
Figure 9B:
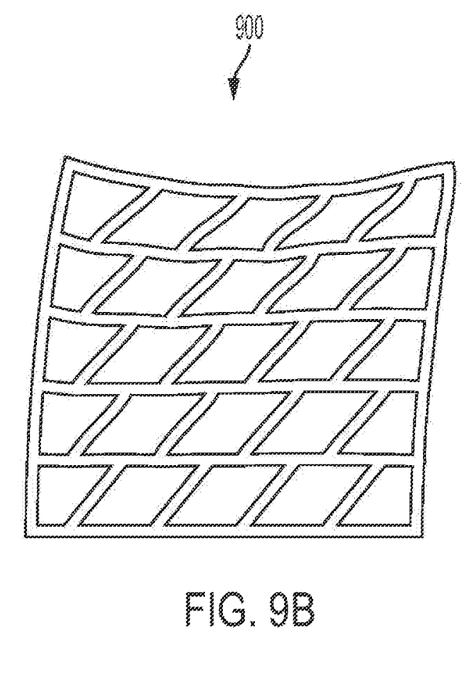
Figure 9C:
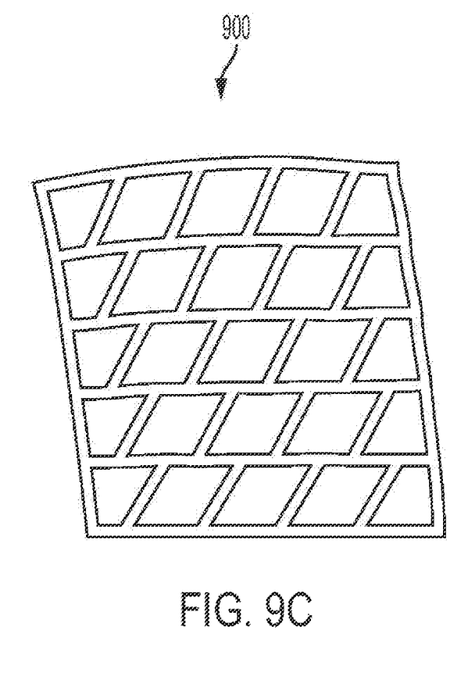

FIGS. 9A-9C illustrate another exemplary embodiment of a lattice-structure 900 in accordance with the present disclosure. The lattice-structure 900 includes a first set of trusses 902 and a second set of trusses 904. The second set of trusses 904 extend continuously through the lattice-structure 900 in a generally horizontal direction while the first set of trusses 902 do not extend continuously through the lattice-structure. Rather, the first set of trusses 902 extend between adjacent second set of trusses 904 and the first set of trusses 902 are aligned at an angle which may oriented with respect to a direction of travel of an occupant H-point along an H-point travel path as explained above. In this manner, the lattice-structure 900 may compress under a vertically applied downward compressive force under normal conditions, thereby providing a degree of comfort and cushioning to an occupant, while also providing the ability to resist and even lift an occupant in response to a shear load being applied by an occupant during a vehicle impact event.

In a preferred embodiment of the present disclosure, the lattice-structure is positioned in the vehicle seat forward of the H-point and may extend substantially forward to a forward edge of the vehicle seat. The lattice-structure should be supported by a support frame of the vehicle seat such as by a seat pan and/or metal frame. The lattice-structure may also extend laterally across a substantial portion of the vehicle seat width.

The lattice-structure of the present disclosure is designed for two different load paths. The first load path being a vertically compressive load path and the second load path being a shear load path. These lattice-structures compress in reaction to a compressive force and resist compression, or even vertically expand, in response to a shear force.

In an exemplary embodiment, a lattice-structure may include rows of trusses that may collapse onto adjacent rows of trusses and, thus, lock and oppose a shear load being applied.

It is to be understood that the geometry of the lattice-structure may be further adapted such that the shape and/or length of individual rows or segments of trusses may vary throughout the extent of the lattice-structure. In this manner, the response to applied forces may vary as those forces increase. Further, the geometry of the trusses may vary throughout the lattice-structure in a manner such that the response to loads may vary as the elapsed time of the applied loads increase and the vehicle impact event progresses. For example, shorter truss lengths may reduce the reaction and/or engagement time of the lattice-structure, while longer truss lengths may delay engagement. Further, the diameter, length, diameter of connecting nodes, shape of connecting nodes, and the like may be varied to provide a varied response throughout the lattice-structure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A vehicle seat cushion for a vehicle, the vehicle seat cushion comprising:
    a seat cushion support structure; and
    a lattice-structured support that is supported by the seat cushion support structure, wherein the lattice-structured support provides a first resistive force in response to a vertically applied force that is less than a second resistive force in response to a force aligned with an H-point travel path of the vehicle occupant during a vehicle impact event, wherein the lattice-structured support comprises a first set of trusses substantially aligned with an instantaneous trajectory of a vehicle occupant H-point travel path, and wherein each of the first set of trusses extend substantially continuously through the entire lattice-structured support.

2. The vehicle seat cushion of claim 1, wherein the first set of trusses are oriented at an angle of between about 25 to about 60 degrees relative to a horizontal axis.

3. The vehicle seat cushion of claim 2, wherein the first set of trusses are oriented at an angle of about 45 relative to the horizontal axis.

4. The vehicle seat cushion of claim 1, wherein the lattice-structured support further comprises a second set of trusses that extend between adjacent trusses of the first set of trusses.

5. The vehicle seat cushion of claim 4, wherein each of the second set of trusses are offset relative to each other.

6. The vehicle seat cushion of claim 4, wherein a plurality of the second set of trusses are V-shaped.

7. The vehicle seat cushion of claim 1, wherein the lattice-structured support comprises a second set of trusses, wherein the second set of trusses extend substantially continuously through the lattice-structured support and are aligned with a horizontal axis.

8. The vehicle seat cushion of claim 7, wherein the first set of trusses are substantially aligned with an instantaneous trajectory of a vehicle occupant H-point travel path.

9. The vehicle seat cushion of claim 7, wherein the first set of trusses extend between adjacent trusses of the second set of trusses.

10. The vehicle seat cushion of claim 7, wherein the first set of trusses are oriented at an angle of between about 25 to about 60 degrees relative to a horizontal axis.

11. The vehicle seat cushion of claim 7, wherein the first set of trusses are oriented at an angle of about 45 relative to the horizontal axis.

12. A vehicle including a seat with a seat cushion, the seat cushion comprising:
a seat cushion support structure; and
a lattice-structured support that is supported by the seat cushion support structure, wherein the lattice-structured support provides a first resistive force in response to a vertically applied force that is less than a second resistive force in response to a force aligned with an H-point travel path of the vehicle occupant during a vehicle impact event, wherein the lattice-structured support comprises a first set of trusses substantially aligned with an instantaneous trajectory of a vehicle occupant H-point travel path, and wherein each of the first set of trusses extend substantially continuously through the entire lattice-structured support.

13. The vehicle of claim 12, wherein the first set of trusses are oriented at an angle of between about 25 to about 60 degrees relative to a horizontal axis.

14. The vehicle of claim 12, wherein the lattice-structured support further comprises a second set of trusses that extend between adjacent trusses of the first set of trusses, and wherein the each of the second set of trusses are offset relative to each other.

15. The vehicle of claim 14, wherein a plurality of the second set of trusses are V-shaped.

16. The vehicle of claim 12, wherein the lattice-structured support comprises a second set of trusses, wherein the second set of trusses extend substantially continuously through the lattice-structured support and are aligned with a horizontal axis, wherein the first set of trusses are substantially aligned with an instantaneous trajectory of a vehicle occupant H-point travel path, wherein the first set of trusses extend between adjacent trusses of the second set of trusses, and wherein the first set of trusses are oriented at an angle of between about 25 to about 60 degrees relative to a horizontal axis.

\* \* \* \* \*